United States Patent Office 3,632,825
Patented Jan. 4, 1972

3,632,825
NICKEL ALKOXIDE COMPOUNDS AND PROCESS
FOR PREPARATION THEREOF
David Paul Jordan, Mahwah, N.J., assignor to The International Nickel Company, Inc., New York, N.Y.
No Drawing. Continuation-in-part of abandoned application Ser. No. 632,931, Apr. 24, 1967. This application Dec. 5, 1968, Ser. No. 781,574
Int. Cl. C07f 15/04; C08f 45/62
U.S. Cl. 260—439 R                27 Claims

ABSTRACT OF THE DISCLOSURE

A process for preparing substantially pure nickel alkoxides in which 2,2'-thiobisphenol, a nickel salt, a primary alcohol and an acid acceptor are reacted in an essentially non-aqueous solvent. The nickel alkoxide precipitate then separates from solution in a substantially pure condition. Useful biological activity and the light stabilization of chlorinated polymers by means of the compounds is disclosed.

---

This application is a continuation-in-part of application Ser. No. 632,931, filed Apr. 24, 1967 and now abandoned.

This invention relates to a new process for preparing nickel alkoxide compounds and, more particularly, to a process for preparing nickel alkoxide derivatives of 2,2'-thiobisphenols, to novel biologically active compounds and to novel stabilizing compounds for chlorinated polymers, such as polyvinyl chloride.

In the field of agriculture it is well recognized that many plant diseases are caused by fungi and extensive plant damage and loss of crops is attributed thereto. The search for new fungicides is a continuing one for a variety of reasons. For example, a fungicide may have special merit only for its effectiveness against a particular disease of one species of plant. Other fungicides will be required for other diseases of the same plant. Thus, there is no universally applicable fungicide, and fungicides which are effective to some degree against the same plant diseases are not necessarily equally effective. In some cases it is desired to apply the fungicide to the foliage of the plant, and in other cases it is desirable to employ fungicides as soil fumigants; different fungicides will usually be required according to the method of application. Cost of the fungicide is also an important factor where treatment of substantial acreage is involved, and this may sway the balance in favor of one fungicide or another. It is thus seen that a varied armament of fungicides is required.

Polyvinyl chloride (PVC) and related chlorinated polymers are light-sensitive and suffer degradation including both discoloration and embrittlement upon exposure to light. Many attempts have been made to stabilize these polymers by introducing various additives, and improvement in the light stability of these materials has been achieved. However, more effective stabilizers are needed.

A new process has now been discovered in which substantially pure nickel alkoxide derivatives of 2,2'-thiobisphenols can be precipitated from solution uncontaminated by starting materials or reaction products. Moreover, the length of time necessary to produce the nickel alkoxide derivatives is substantially reduced, thus adding to the commercial attractiveness of the process.

It has further been discovered that the novel compounds prepared by the process of the invention are useful as fungicides and as light stabilizers for chlorinated polymers.

It is an object of the present invention to provide a process of making substantially pure, stable nickel alkoxide derivatives of 2,2'-thiobisphenols free from contamination by starting materials or reaction products.

Another object of the invention is to provide a relatively simple and commercially attractive process of making nickel methoxide derivatives of 2,2'-thiobisphenols.

Other objects and advantages will become apparent from the following description.

Generally speaking, the present invention contemplates a process of making substantially pure nickel alkoxide derivatives having the general structural formula

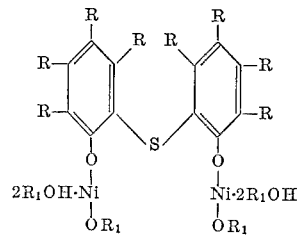

in which $R_1$ is an alkyl group having between 1 and 4 carbon atoms and R is selected from the group consisting of hydrogen; alkyls, e.g., butyl; substituted alkyls; e.g., tertiary butyl; aryls, e.g., phenyl; alkylaryls, e.g., methylphenyl; halogens or any combination thereof. The compounds provided in accordance with the invention are useful as fungicides and as light-stabilizers in chlorinated polymers such as polyvinyl chloride. The compounds of the invention characteristically contain nickel and sulfur in the molar proportions of 2:1.

In accordance with a first aspect of this invention, the nickel alkoxide derivatives of 2,2'-thiobisphenol are prepared, free from by-product contamination, by reacting a 2,2'-thiobisphenol having the general structural formula,

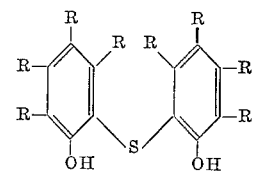

in which R is selected from the group consisting of hydrogen; alkyls, e.g., butyl; substituted alkyls, e.g. tertiary butyl; aryls, e.g., phenyl; alkylaryls, e.g., methylphenyl; halogens or any combination thereof; a nickel salt selected from the group consisting of chloride, bromide, iodide, acetate tetrahydrate and nitrate hexahydrate; a primary alcohol reactant selected from the group consisting of methanol, ethanol, propanol, butanol and isobutanol; and an alcohol soluble acid acceptor selected from the group consisting of ammonia, e.g., anhydrous ammonia, alkylamines having between 1 and 6 carbon atoms, e.g., diethylamine and triethylamine, arylamines having between 6 and 12 carbon atoms, e.g., aniline, toluidine and diphenylamine, pyridine, methylpyridine and ethylpyridine; in an essentially non-aqueous solvent selected from the group consisting of methanol, ethanol, propanol, butanol, isobutanol, dimethoxyethane, dimethylformamide, tetrahydrofuran and dimethylsulfoxide; and precipitating the nickel alkoxide in a substantially pure condition. The nickel alkoxide derivative precipitates from solution in an essentially pure condition and can be separated from solution as, for example, by filtration and thereafter dried. This process affords the advantage that the nickel alkoxide product is directly formed and then precipitated from solution permitting separation thereof from the liquid reaction medium and reaction by-products without other complex operations to separate solid by-products.

It is to be appreciated that substituents designated by the symbol R in the structural formula for the 2,2'-thiobisphenol may occupy all available positions on the benzene rings in the molecule, i.e., the 3,3', 4,4', 5,5', and 6,6' positions.

The acid acceptor reacts with the by-product containing the anion added by means of the nickel salt to form an ammonium salt which does not interfere with the reaction but which instead dissolves in the solvent thereby permitting completion of the reaction, and enabling the production of the nickel alkoxide product uncontaminated with solid by-product upon filtration. The alcohol can function both as reactant and solvent, i.e., the stoichiometric amount of alcohol functions as reactant while an excess amount of alcohol functions as solvent.

In addition, non-alcoholic solvents such, for example, as dimethoxyethane, dimethylformamide, tetrahydrofuran and dimethylsulfoxide can be added to dissolve the ammonium salt by-product. However, since the nickel alkoxide derivative is soluble in each of these non-alcoholic solvents, it is necessary to add a sufficient excess of the primary alcohol to cause the nickel alkoxide derivative to precipitate. Advantageous results, however, have been achieved by merely using an excess of the primary alcohol as a solvent.

The reaction medium is essentially non-aqueous, although water may be present in amounts up to about 5% by volume in the solvent. Since anhydrous nickel halides are generally insoluble in dry alcohols, a small amount of water, e.g., up to about 5%, is advantageously present in the system, e.g., either intentionally added or present in the nickel salt or solvent.

All reactants should be substantially free from deleterious amounts of impurities, e.g., sodium, in order to permit the nickel alkoxide derivative to precipitate from solution in substantially pure form.

In another aspect of this invention, that directed to the use of the novel compounds as fungicides, a fungicidal composition containing a carrier and a compound of this invention is provided. Plants may be sprayed with such fungicidal composition, or the composition may be introduced into the fungus-infested soil. The compounds of the invention exhibit fungicidal activity in amounts as low as 100 parts per million (p.p.m.) although higher concentrations can be used without excessive damage to the plants. In preparing the fungicidal compositions, the compounds are dissolved in a suitable solvent, such as acetone, and then diluted in water to the desired concentration. The compounds may also be incorporated in a wettable powder composition for application by dusting. In treating soil, the compositions may be injected into the soil or sprayed or dusted on the soil surface prior to plowing and turned into the soil when the field is plowed preparatory to planting.

In still another aspect of this invention, i.e., the use of the nickel compounds as light stabilizers for chlorinated polymers such as polyvinyl chloride, the nickel compound is dry mixed in a proportion of from 1 to 10 parts by weight of compound per 100 parts of the polymer, and with other necessary ingredients, at a temperature of about 75° F. to 275° F. until the powder mixture is well blended and then, after cooling, the powder mixture is extruded or otherwise processed to final form. This treated polymer is characterized by substantial stability upon exposure to natural or artificial light for extended periods.

In order to give those skilled in the art a better understanding of the invention, particularly, the preparation of compounds in accordance with the invention, the following illustrative examples are given:

EXAMPLE 1

Twenty grams (0.0452 mole) of 2,2'-thiobis (4,6-ditertiarybutylphenol) were dissolved in 300 milliliters of methanol containing 23.0 g. (0.0904 mole) of nickel bromide dihydrate. Then, with vigorous stirring, 18.6 milliliters (0.181 mole) of diethylamine were added dropwise over a period of 5 to 10 minutes. As the last of the amine was added, the deep green solution rapidly changed to a blue-green slurry of the methanol-insoluble nickel methoxide product. Since unused reactants and the by-product, diethylamine hydrobromide, are all methanol soluble, the nickel methoxide derivative was simply filtered off and then washed with methanol until the washings gave a negative test for halogen. The nickel methoxide derivative was dried overnight under vacuum with a nitrogen bleed. The yield was 28.5 g. of blue-green crystalline powder which was 84.4% of theoretical.

A sample of the nickel methoxide derivative was subjected to hydrolysis with 10% sulfuric acid thus breaking it into its constituent parts, i.e., thiobisphenol, nickel II ion, and methanol, which could then be measured by standard techniques. The molar ratios of these constituent parts were then found to be 1 thiobisphenol, 2 nickels and 6 methanols. This information and the necessity of conserving the two valences of nickel led to the following general structure for the nickel methoxide derivative, 2,2'-thiobis (4,6-ditertiarybutylphenoxy nickel methoxide dimethanolate):

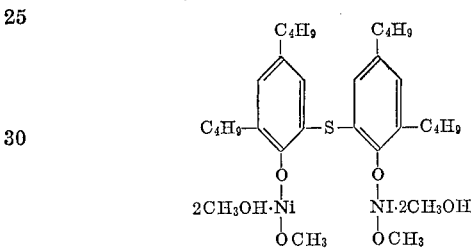

The calculated analysis for $C_{34}H_{62}SO_8Ni_2$, the empirical formula for the above nickel methoxide derivative, was as follows: 54.5% carbon; 8.75% hydrogen; 4.29% sulfur; 17.1% oxygen; 15.7% nickel. The observed analysis was: 53.5% carbon; 8.25% hydrogen; 3.61% sulfur; 17.8% oxygen; 16.8% nickel. All analyses are in weight percent.

The over-all reactions are believed to take place as follows:

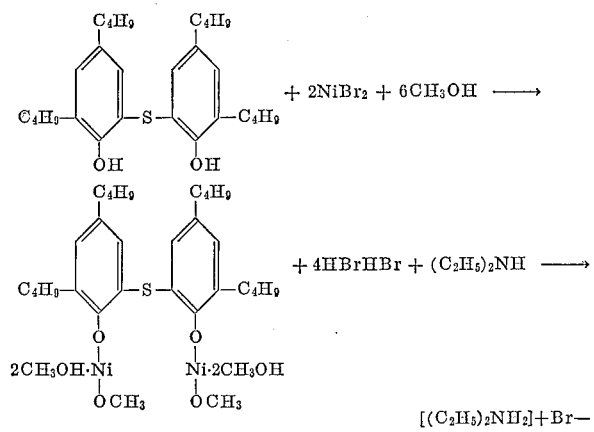

EXAMPLE 2

Nickel bromide dihydrate in the amount of 0.2 mole was added as a solid to 1 liter of a well agitated 0.1 M solution of 2,2'-thiobis (4,6-ditertiaryamylphenol) in methanol. When dissolution was complete, 0.4 mole of diethylamine was added dropwise. After precipitation, the nickel methoxide derivative was separated from solution and washed in the same manner as Example 1. The dried precipitate was a blue-green crystalline powder and the yield was 88% of theoretical.

A sample of the nickel methoxide derivative was subjected to hydrolysis in the same manner as Example 1. The following is the general structure for the nickel methoxide derivative, 2,2'-thiobis (4,6-ditertiaryamylphenoxy nickel methoxide dimethanolate):

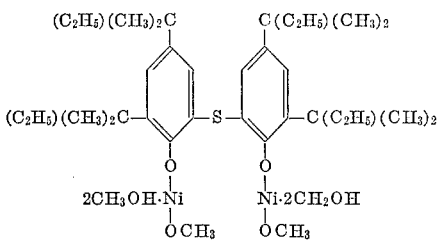

The calculated analysis for $C_{38}H_{70}Ni_2O_8S$, the empirical formula for the above nickel methoxide derivative, was as follows:

56.8% carbon; 8.77% hydrogen; 3.99% sulfur; 15.9% oxygen; 14.6% nickel. The observed analysis was 57.5% carbon; 9.04% hydrogen; 4.04% sulfur; 17.7% oxygen; 14.9% nickel.

EXAMPLE 3

Nickel bromide dihydrate in the amount of 0.2 mole was added as a solid to 1 liter of a well agitated 0.1 M solution of 2,2'-thiobis (4-tertiarybutyl-6-methylphenol) in methanol. When dissolution was complete, 0.4 mole of diethylamine was added dropwise. After precipitation, the nickel methoxide derivative was separated from solution and washed in the same manner as Example 1. The dried precipitate was a blue-green crystalline powder and the yield was 82% of theoretical.

A sample of the nickel methoxide derivative was subjected to hydrolysis in the same manner as Example 1. The following is the general structure for the nickel methoxide derivative, 2,2'-thiobis (4-tertiarybutyl-6-methylphenoxy nickel methoxide dimethanolate):

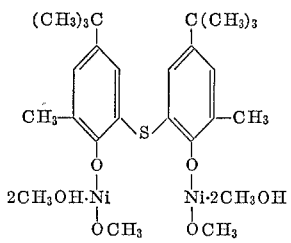

The calculated analysis for $C_{28}H_{50}Ni_2O_8S$, the empirical formula for the above nickel methoxide derivative, was as follows: 52.7% carbon; 7.27% hydrogen; 4.62% sulfur; 18.5% oxygen; 17.0% nickel. The observed analysis was 51.2% carbon; 7.52% hydrogen; 18.8% nickel; 19.5% oxygen; 4.90% sulfur.

EXAMPLE 4

Nickel bromide dihydrate in the amount of 0.2 mole was added as a solid to 1 liter of well agitated 0.1 M solution of 2,2'-thiobis (4-methyl-6-tertiarybutylphenol) in methanol. When dissolution was complete, 0.4 mole of diethylamine was added dropwise. After precipitation, the nickel methoxide derivative was separated from solution and washed in the same manner as Example 1. The dried precipitate was a blue-green crystalline powder and the yield was 82% of theoretical.

A sample of the nickel methoxide derivative was subjected to hydrolysis in the same manner as Example 1. The following is the general structure for the nickel methoxide derivative, 2,2'-thiobis (4-methyl-6-tertiarybutylphenoxy nickel methoxide dimethanolate):

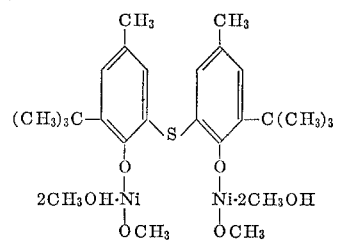

The calculated analysis for $C_{28}H_{50}Ni_2O_8S$, the empirical formula for the above nickel methoxide derivative, was as follows: 52.7% carbon; 7.27% hydrogen; 17.0% nickel; 18.5% oxygen; 4.62% sulfur. The observed analysis was 50.8% carbon; 7.72% hydrogen; 17.9% nickel; 21.0% oxygen; 4.97% sulfur.

EXAMPLE 5

Nickel bromide dihydrate in the amount of 0.2 mole was added as a solid to 1 liter of a well agitated 0.1 M solution of 2,2'-thiobis (4,6-dimethylphenol) in methanol. When dissolution was complete, 0.4 mole of diethylamine was added dropwise. After precipitation, the nickel methoxide derivative was separated from solution and washed in the same manner as Example 1. The dried precipitate was a blue-green crystalline powder and the yield was 90% of theoretical.

A sample of the nickel methoxide derivative was subjected to hydrolysis in the same manner as Example 1. The following is the general structure for the nickel methoxide derivative, 2,2'-thiobis(4,6-dimethylphenoxy nickel methoxide dimethanolate):

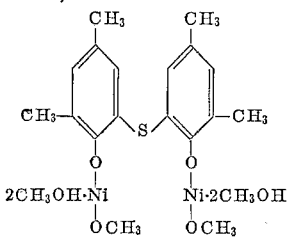

The calculated analysis for $C_{22}H_{38}Ni_2O_8S$, the empirical formula for the above nickel methoxide derivative, was as follows: 45.5% carbon; 6.59% hydrogen; 20.2% nickel; 22.1% oxygen; 5.53% sulfur. The observed analysis was: 45.8% carbon; 6:46% hydrogen; 20.5% nickel; 20.6% oxygen; 5.45% sulfur.

EXAMPLE 6

Nickel bromide dihydrate in the amount of 0.2 mole was added as a solid to 1 liter of a well agitated 0.1 M solution of 2,2'-thiobis (4-octylpheol) in methanol. When dissolution was complete, 0.4 mole of diethylamine was added dropwise. After precipitation, the nickel methoxide derivative was separated from solution and washed in the same manner as Example 1. The dried precipitate was a blue-green powder having a crystalline appearance and the yield was 80% of theoretical.

A sample of the nickel methoxide derivative was subjected to hydrolysis in the same manner as Example 1. The following is the general structure for the nickel methoxide derivative, 2,2'-thiobis (4-octylphenoxy nickel methoxide dimethanolate):

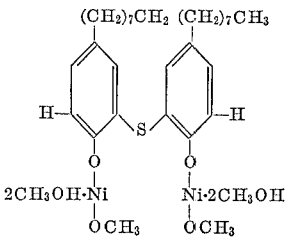

The empirical formula for the foregoing nickel methoxide derivative is $C_{34}H_{62}Ni_2O_8S$.

EXAMPLE 7

Nickel bromide dihydrate in the amount of 0.2 mole was added as a solid to 1 liter of a well agitated 0.1 M solution of 2,2'-thiobis (4,6-dichlorophenol) in methanol. When dissolution was complete, 0.4 mole of diethylamine was added dropwise. After precipitation, the nickel methoxide derivative was separated from solution and washed in the same manner as Example 1. The dried precipitate was a blue-green crystalline powder and the yield was 50% of theoretical.

A sample of the nickel methoxide derivative was subjected to hydrolysis in the same manner as Example 1. The following is the general structure for the nickel methoxide derivative, 2,2'-thiobis (4,6-dichlorophenoxy nickel methoxide dimethanolate):

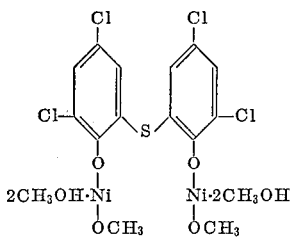

The empirical formula for the above nickel methoxide derivative is $C_{18}H_{26}Cl_4Ni_2O_8S$.

EXAMPLE 8

Nickel bromide dihydrate in the amount of 0.2 mole was added as a solid to 1 liter of a well agitated 0.1 M solution of 2,2'-thiobis (4-tertiarybutylphenol) in methanol. When dissolution was complete, 0.4 mole of diethylamine was added dropwise. After precipitation, the nickel methoxide derivative was separated from solution and washed in the same manner as Example 1. The dried precipitate was a blue-green crystalline powder and the yield was 85% of theoretical.

A sample of the nickel methoxide derivative was subjected to hydrolysis in the same manner as Example 1. The following is the general structure for the nickel methoxide derivative, 2,2'-thiobis (4-tertiarybutylphenoxy nickel methoxide dimethanolate):

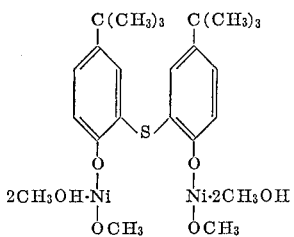

The empirical formula for the above nickel methoxide derivative is $C_{26}H_{46}Ni_2O_8S$.

The 2,2'-thiobis (4-methyl-6-tertiarybutylphenol) of Example 4 and 2,2'-thiobis (4,6-dichlorophenol) of Example 7 were obtained commercially. The 2,2'-thiobisphenols of Examples 1, 2, 3, 5, 6 and 8 were prepared in the following manner: 1 liter of a 4 M solution of the appropriate alkyl phenol in carbon tetrachloride was cooled at 5° C. Two moles of freshly distilled sulfur dichloride was then added dropwise. The rate of addition was adjusted so that the temperature of the solution remained at 5° C. The evolved HCl was trapped in ice water. At the end of the reaction, the carbon tetrachloride was stripped under reduced pressure. The resulting yellow viscous oils were crystallized from pentane or methanol. It is believed that the principal competing reaction is polymeric sulfur bridging between the alpha carbon atoms of the phenol and consequently the best yields can generally be expected with the phenol which has only one alpha position substituted.

In carrying the invention into practice, it is advantageous to prepare the nickel alkoxide derivatives under an inert atmosphere, e.g., a nitrogen atmosphere, in order to avoid oxidation.

Advantageous results can be achieved using a simple amine, e.g., diethylamine or triethylamine, as the acid acceptor.

The use of the alcohol as a reactant is indispensable whereas its function as a solvent to dissolve by-products can be performed by other solvents, e.g., dimethoxyethane. It has been found, however, that advantageous results can be achieved using a primary alcohol, e.g., methanol, both as reactant and solvent.

The temperature at which the reactions are carried out should not be high enough to cause vaporization of the solvent or acid acceptor nor low enough to prevent dissolution of the reactants or by-products. It is advantageous, therefore, that the process be performed at room temperature.

The nickel alkoxide derivatives, particularly the nickel methoxide derivatives of 2,2'-thiobisphenol, prepared in accordance with this invention, have shown useful properties as fungicides and as heat and light stabilizers in polypropylene and other plastics, as will be discussed below.

Illustrative examples of the use of the compounds of the invention as fungicides are given, with the compounds tested set forth in the following table:

TABLE I

Compound 1 ..... 2,2'-thiobis-(4,6-dichlorophenoxy nickel methoxide dimethanolate).
Compound 2 ..... 2,2'-thiobis-(4,6-dimethylphenoxy nickel methoxide dimethanolate).
Compound 3 ..... 2,2'-thiobis-(4,6-ditertiaryamylphenoxy nickel methoxide dimethanolate).

EXAMPLE 9

The foliar fungicidal activity of the compounds 1 and 2 of Table I were determined against Phytophthora infestans, the fungus which causes late blight of tomatoes (LBT). In this test, compounds 1 and 2 were first dissolved in acetone and then diluted with deionized water containing wetting and dispersing agents to a concentration of 1000 p.p.m. Several groups of tomato plants, approximately five to six weeks old, in the five-leaf growth stage, were used for this test, each group being sprayed at 30 pounds pressure with a solution of one of the compounds. After drying, the treated plants and a group of untreated plants were sprayed with a mixed sporangial and zoospore suspension of Phytophthora infestans and immediately thereafter placed in an incubation chamber maintained at 70° F. and 95% relative humidity. After 40 hours in the incubation chamber, the plants were removed and observed for total infection lesions of the top three leaves of each plant. The activity of the compounds is expressed in the following table as the percent organism control achieved in treated plants when compared with untreated inoculated plants.

TABLE II

| Compound: | Percent organism control |
|---|---|
| 1 | 84 |
| 2 | 48 |

Little or no plant damage attributable to the fungicides under test was observed.

In contrast, the nickel-free precursors of compounds 1 and 2, 2,2'-thiobis (4,6-dichlorophenol) and 2,2'-thiobis (4,6-dimethylphenol), respectively, tested under the same conditions, effected no detectable control against Phytophthora infestans.

EXAMPLE 10

The foliar fungicidal activity of the compounds 1 and 3 were determined against Xanthomas vesicatoria, the fungus which causes bacterial leaf spot of tomatoes (BLST). The compounds were prepared for spraying in the same manner as in Example 9. Several groups of tomato plants, approximately six to seven weeks old, in the six to seven leaf-growth stage, were used in this test, each group being sprayed at 35 pounds pressure for 50 seconds with solutions of one of the compounds. After drying, the treated plants and a group of untreated plants were spray-inoculated at 30 pounds pressure with an aqueous cell suspension of Xanthomas vesicatoria containing 5% Carborundum and immediately thereafter placed in an incubation chamber which was maintained at 70° F. and a relative humidity of over 95%. After 40 hours in the incubation chamber, the plants were removed to a greenhouse for further development of infection lesions. Disease severity was determined by a count of lesions present on six to seven treated leaves, and effectiveness of the compound was determined by a direct comparison with inoculated controls. Compound 3 was also tested at a concentration of 500 p.p.m. The results of the tests are set forth in the following table.

TABLE III

| Compound: | Percent organism control |
|---|---|
| 1 | 75 |
| 3 | 96 |
| 3 (500 p.p.m.) | 66 |

Little or no plant damage attributable to the fungicides under test was observed.

The above Examples 9 and 10 clearly establish that the nickel compounds tested are effective foliar fungicides against the plant diseases involved.

EXAMPLE 11

The activity of compounds 1 and 2 as soil fungicides were determined against the fungus, Rhizoctonia solani (Rs). In this test, solutions of compounds 1 and 2 were added to separate units of sterilized soil at a concentration sufficient to obtain twice the final chemical concentration desired (100 p.p.m.). Rhizoctonia solani inoculum was added to sterile soil in an amount sufficient to provide twice the desired final fungal concentration on a dry weight basis, the inoculated soil was placed in a sealed soil blender and thoroughly blended to obtain a homogeneous mixture. The soil units treated with either compound 1 or compound 2 were then each added to an equivalent amount of Rhizoctonia-inoculated soil, placed in soil blenders, and thoroughly blended. The resulting blend of Rhizoctonia-inoculated and chemically-treated soil was divided equally into suitable containers, seeded with suitable plant species, water sealed to prevent loss of potential chemical vapor phase and removed to a greenhouse. Similar plantings were made in sterile soil alone and in sterile soil inoculated with Rhizoctonia for purposes of comparison. The control effectiveness of the compounds was determined by actual count of the number of surviving plants in soil which was Rhizoctonia inoculated and treated with nickel compound compared with the number of plants surviving in soil which was Rhizoctonia-inoculated but otherwise untreated. The results of these tests are presented in the following table:

TABLE IV

| Compound: | Percent organism control |
|---|---|
| 1 | 57 |
| 2 | 43 |

Substantially no plant damage attributable to the nickel compounds was observed.

It is thus seen that the nickel compounds tested have substantial effectiveness against fungus when applied to the soil.

The following example is presented to illustrated that aspect of the invention directed to the stabilizing of chlorinated polymers against degradation upon exposure to light. In addition to compounds 1 and 2 of Table I, the compounds set forth in the following table were tested:

TABLE V

Compound 4 ..... 2,2'-thiobis-(4-methyl-6-tertiarybutylphenoxy nickel methoxide dimethanolate).
Compound 5 ..... 2,2'-thiobis-(4-tertiarybutylphenoxy nickel methoxide dimethanolate).

EXAMPLE 12

Compounds 1, 2, 4 and 5 were evaluated as light stabilizers by incorporation in polyvinyl chloride (PVC) film samples. In preparing the PVC film each of the compounds to be tested was added in the amount of one part by weight of the nickel compound to 100 parts by weight of PVC powder in a dry mixing head of the Brabender Plastograph. The mixture was heated to 200° F. during mixing and then the temperature was raised to 230° F. and mixing was continued for an additional 10 minutes. At this point, 50 parts of dioctyl phthalate, a plasticizer, and 2 parts of a glyceride lubricant, a mold release, were added. The batch was dry blended for 45 minutes at 260° F. to 280° F. and then cooled. The blended powder was then transferred to an extruder hopper and fed into the extruder screw. The extrusion was carried out at a temperature of 300° F. and a 2" wide by 0.01" thick film was extruded. The film was cut into 6" lengths which were clamped in suitable holders under slight tension. Film holders containing PVC film samples incorporating the stabilizing nickel compounds of the invention as well as PVC film samples free from such stabilizing compounds (blanks), were exposed in a carbon arc illuminated weatherometer. The cycle time of accelerated weathering was 102 minutes of simulated sunshine (carbon arc illumination) followed by 18 minutes of simulated sunshine plus rain (water spray). The results obtained are set forth in the following table:

TABLE VI

| Additive in PVC film (1%) | Hours to failure | Type failure |
|---|---|---|
| Compound 1 | 770; 627; 679 | Brittle, discolored. |
| Compound 2 | 1,022; 1,082; 1,083 | Do. |
| Compound 4 | 1,105; 1,082; 1,105 | Do. |
| Compound 5 | 1,082 | Do. |
| Blank A | 230 | Black. |
| Blank B | 234 | Dark and brittle. |
| Blank C | 270 | Brittle. |
| Blank D | 229 | Do. |
| Blank E | 236 | Do. |
| Blank F | 236 | Do. |

Nickel thiobisphenolates clearly inhibit polyvinyl chloride against degradation upon exposure to light, with times to failure ranging from just over 625 hours to more than 1100 hours. In contrast, the uninhibited samples (blanks) consistently failed at less than 300 hours.

It is to be observed that the present invention provides novel nickel alkoxide compounds as well as a novel process for making such compounds. In addition, the novel compounds of the invention are shown to be useful in a method for controlling fungus and in a method for stabilizing chlorinated polymers against degradation upon exposure to light.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A process for preparing nickel alkoxide derivatives of 2,2'-thiobisphenols, free from solid by-product contamination, which comprises:

(a) reacting a 2,2'-thiobisphenol having the general formula,

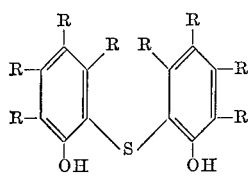

in which R is selected from the group consisting of hydrogen, alkyls, substituted alkyls, aryls, alkylaryls and halogens; a nickel salt selected from the group consisting of chlorides, bromides, iodides, acetate tetrahydrate and nitrate hexahydrate; the mole ratio of the nickel salt reactant to the 2,2'-thiobisphenol reactant being essentially 2:1; a primary alcohol reactant selected from the group consisting of methanol, ethanol, propanol, butanol and isobutanol; and an alcohol soluble acid acceptor selected from the group consisting of ammonia, alkylamines having between 1 and 6 carbon atoms, arylamines having between 6 and 12 carbon atoms, pyridine, methylpyridine and ethylpyridine; in an essentially non-aqueous solvent to produce a nickel alkoxide; and (b) precipitating the nickel alkoxide in a substantially pure condition.

2. A process in accordance with claim 1 performed under an inert atmosphere.

3. A process in accordance with claim 1 wherein the solvent is selected from the group consisting of methanol, ethanol, propanol, butanol, isobutanol, dimethoxyethane, dimethylformamide, tetrahydrofuran, and dimethylsulfoxide; and the nickel alkoxide is precipitated in the presence of an excess of the primary alcohol.

4. A process in accordance with claim 1 wherein the alcohol reactant is ethanol.

5. A process in accordance with claim 1 wherein the alcohol reactant is methanol.

6. A process in accordance with claim 5 wherein the solvent is methanol.

7. A process in accordance with claim 6 wherein the acid acceptor is diethylamine.

8. A process in accordance with claim 7 wherein the nickel salt is nickel bromide.

9. A process in accordance with claim 8 wherein the thiobisphenol is 2,2'-thiobis (4,6-ditertiarybutylphenol).

10. A process in accordance with claim 8 wherein the thiobisphenol is 2,2'-thiobis (4,6-ditertiaryamylphenol).

11. A process in accordance with claim 8 wherein the thiobisphenol is 2,2'-thiobis (4-tertiarybutyl-6-methylphenol).

12. A process in accordance with claim 8 wherein the thiobisphenol is 2,2'-thiobis (4-methyl-6-tertiarybutylphenol).

13. A process in accordance with claim 8 wherein the thiobisphenol is 2,2'-thiobis (4,6-dimethylphenol).

14. A process in accordance with claim 8 wherein the thiobisphenol is 2,2'-thiobis (4-octylphenol).

15. A process in accordance with claim 8 wherein the thiobisphenol is 2,2'-thiobis (4,6-dichlorophenol).

16. A process in accordance with claim 8 wherein the nickel bromide is hydrated.

17. A process of preparing 2,2'-thiobis (4,6-ditertiarybutylphenoxy nickel methoxide dimethanolate), free from solid by-product contamination, which comprises reacting 2,2'-thiobis (4,6-ditertiarybutylphenol), nickel bromide dihydrate, methanol, and diethylamine, in a methanol solvent and thereafter precipitation 2,2'-thiobis (4,6-ditertiarybutylphenoxy nickel methoxide dimethanolate) in a substantially pure condition.

18. A substantially pure compound having the general formula

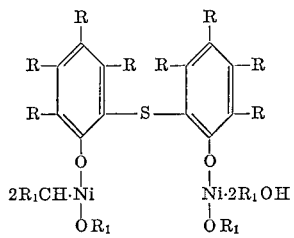

in which an $R_1$ is an alkyl group having between 1 and 4 carbon atoms and R is selected from the group consisting of hydrogen, straight and branched chain alkyls having from 1 to 8 carbon atoms, phenyl, methylphenyl and halogens.

19. The compound of claim 18 in which $R_1$ is a methyl group and R is hydrogen in three positions on each benzene ring, and an octyl group at position 4,4'.

20. The compound of claim 18 in which $R_1$ is a methyl group and R is hydrogen in three positions on each benzene ring, and is a tertiary butyl group at position 4,4'.

21. The compound of claim 18 in which $R_1$ is a methyl group and R, in at least two positions in each benzene ring, is hydrogen.

22. The compound of claim 21 in which R is a tertiary butyl group at positions 4,4' and 6,6'.

23. The compound of claim 21 in which R is a tertiary amyl group at positions 4,4' and 6,6'.

24. The compound of claim 21 in which R is a tertiary butyl group at position 4,4' and a methyl group at position 6,6'.

25. The compound of claim 21 in which R is a methyl group at position 4,4' and a tertiary butyl group at position 6,6'.

26. The compound of claim 21 in which R is a methyl group at positions 4,4' and 6,6'.

27. The compound of claim 21 in which R is chlorine at positions 4,4' and 6,6'.

References Cited

UNITED STATES PATENTS

| 3,218,294 | 11/1965 | Rodgers et al. | 260—45.75 |
| 3,321,502 | 5/1967 | Soeder | 260—439 |
| 3,390,160 | 6/1968 | Heller et al. | 260—433 |

TOBIAS E. LEVOW, Primary Examiner

A. P. DEMERS, Assistant Examiner

U.S. Cl. X.R.

260—45.75 N; 424—295